US009873093B2

(12) United States Patent
Visser et al.

(10) Patent No.: US 9,873,093 B2
(45) Date of Patent: Jan. 23, 2018

(54) METHOD FOR PRODUCING POLYIMIDE MEMBRANES

(71) Applicant: Evonik Fibres GmbH, Schörfling am Attersee (AT)

(72) Inventors: Tymen Visser, Beek (NL); Markus Ungerank, Perg (AT); Jörg Balster, Schörfling am Attersee (AT); Christoph Führer, Pinsdorf (AT)

(73) Assignee: Evonik Fibres GmbH, Schörfling am Attersee (AT)

( * ) Notice: Subject to any disclaimer, the term of this patent is extended or adjusted under 35 U.S.C. 154(b) by 0 days.

(21) Appl. No.: 14/900,012

(22) PCT Filed: May 22, 2014

(86) PCT No.: PCT/EP2014/060523
§ 371 (c)(1),
(2) Date: Dec. 18, 2015

(87) PCT Pub. No.: WO2014/202324
PCT Pub. Date: Dec. 24, 2014

(65) Prior Publication Data
US 2016/0144323 A1 May 26, 2016

(30) Foreign Application Priority Data
Jun. 21, 2013 (EP) .................................... 13173227

(51) Int. Cl.
*B01D 53/22* (2006.01)
*B01D 67/00* (2006.01)
*B01D 71/64* (2006.01)
*B01D 69/08* (2006.01)
*B29C 71/02* (2006.01)
*B29K 79/00* (2006.01)
*B29L 31/00* (2006.01)

(52) U.S. Cl.
CPC ........... *B01D 71/64* (2013.01); *B01D 53/228* (2013.01); *B01D 67/0009* (2013.01); *B01D 67/0083* (2013.01); *B01D 69/08* (2013.01); *B29C 71/02* (2013.01); *B01D 2053/221* (2013.01); *B01D 2053/224* (2013.01); *B01D 2323/08* (2013.01); *B29C 2071/022* (2013.01); *B29K 2079/08* (2013.01); *B29L 2031/755* (2013.01)

(58) Field of Classification Search
CPC .. B01D 53/22; B01D 53/228; B01D 67/0009; B01D 67/0083; B01D 69/08; B01D 71/64; B01D 2323/08; B29C 71/02; B29C 2071/022
See application file for complete search history.

(56) References Cited

U.S. PATENT DOCUMENTS

| | | | | |
|---|---|---|---|---|
| 3,708,458 A | * | 1/1973 | Alberino | C08G 73/1042 528/222 |
| 4,952,319 A | * | 8/1990 | Yanaga | B01D 71/64 210/640 |
| 5,635,067 A | | 6/1997 | Macheras | |
| 5,807,787 A | * | 9/1998 | Fu | H01L 21/31138 257/E21.256 |
| 7,018,445 B2 | | 3/2006 | Simmons et al. | |
| 7,025,804 B2 | | 4/2006 | Simmons et al. | |
| 7,169,885 B2 | | 1/2007 | Chung et al. | |
| 2006/0156920 A1 | | 7/2006 | Ekiner et al. | |
| 2009/0286078 A1 | | 11/2009 | Lee et al. | |
| 2010/0243567 A1 | | 9/2010 | Liu et al. | |
| 2011/0130611 A1 | * | 6/2011 | Gonzalez | B01D 53/228 585/818 |
| 2011/0269915 A1 | * | 11/2011 | Koros | B01D 53/228 525/420 |
| 2012/0123079 A1 | * | 5/2012 | Ungerank | B01D 53/228 528/67 |
| 2016/0310912 A1 | | 10/2016 | Ungerank et al. | |

FOREIGN PATENT DOCUMENTS

| | | |
|---|---|---|
| EP | 0321569 | 6/1989 |
| EP | 1457253 | 9/2004 |
| WO | 2000006293 | 2/2000 |
| WO | 2004050223 | 6/2004 |
| WO | 2007125367 | 11/2004 |
| WO | 2006068626 | 6/2006 |
| WO | 2006092677 | 9/2006 |
| WO | 2011009919 | 1/2011 |

OTHER PUBLICATIONS

Intellectual Property Office of Singapore Written Opinion for Application No. 11201509020R dated Jun. 1, 2016 (13 pages).
European Search Report for Application No. 13173227.3 dated Nov. 25, 2013 (10 pages).
International Search Report and Written Opinion for Application No. PCT/EP2014/060523 dated Aug. 6, 2014 (14 gages).
Barsema et al., "Preparation and characterization of highly selective dense and hollow fiber asymmetric membranes based on BTDA-TDI/MDI co-polyimide", Journal of Membrane Science, 2003, 216 (1-2) 195-205.
Liu et al., "The development of high performance P84 co-polyimide hollow fibers for pervaporation dehydration of sopropanol", Chemical Engineering Science, 60, 2005, 6674-6686.
Ren et al., "Membrane structure control of BTDA-TDI/MDI (P84) co-polyimide asymmetric membranes by wet-phase inversion process", Journal of Membrane Science, 241, 2004, 305-314.
Ren et al., "Development of asymmetric BTDA-TDI/MDI (P84) co-polyimide hollow fiber membranes for ultrafiltration: The influence of shear rate and approaching ratio on membrane morphology and performance", Journal of Membrane Science, 248, 2005, 177-188.

* cited by examiner

*Primary Examiner* — Jason M Greene
(74) *Attorney, Agent, or Firm* — Michael Best & Friedrich LLP

(57) ABSTRACT

The invention concerns polyimide membranes, preferably composed of P84 type 70 or P84 HT, having improved chemical and physical properties, a method of producing same and also their use.

36 Claims, No Drawings

METHOD FOR PRODUCING POLYIMIDE MEMBRANES

CROSS-REFERENCE TO RELATED APPLICATIONS

This patent application is a national stage filing under 35 U.S.C. 371 of International Application No. PCT/EP2014/060523, filed May 22, 2014, which claims the benefit of priority to European Patent Application No. 13173227.3, filed Jun. 21, 2013, the disclosures of which are incorporated by reference herein in their entireties. Priority to each application is hereby claimed.

TECHNICAL FIELD

The invention concerns polyimide membranes, preferably composed of a P84 modification, more preferably of P84 type 70 or P84 HT, having improved chemical and physical properties, a method of producing same and also their use.

PRIOR ART

The production of phase inversion membranes in general requires polymers that are soluble in conventional water-miscible solvents. Many additives such as cosolvents, non-solvents, pore-formers, hydrophilicizers etc are admixed in order to influence the properties of the membranes. The starting point for this is usually a polymer pellet or powder material, the casting solution being produced by pasting up with the solvents and additives. Success in membrane production, as elsewhere, depends decisively on the molar mass and the molar mass distribution of the polymer used. In general, polymers with high molar masses and narrow distribution are required.

P84 is a polymer which is well known in the literature and is used for the production of flat sheet membranes and hollow fibre membranes (US 2006/0156920, WO 04050223, U.S. Pat. No. 7,018,445, U.S. Pat. No. 5,635,067, EP 1457253, U.S. Pat. No. 7,169,885, US 20040177753, U.S. Pat. No. 7,025,804, J. N Barsema et al, J. of Membrane Science, 216, 2003, 195-205; J. Ren et al, J. of Membrane Science, 241, 2004, 305-314; Liu et al, Chem. Eng. Sci., 60, 2005, 6674-6686; J. Ren et al, J. of Membrane Science, 248, 2005, 177-188). P84 is marketed in several modifications, in particular P84 type 70 and P84 HT, in powder form by HP Polymer of Lenzing in Austria. The customers then redissolve this powder in aprotic dipolar solvents and admix it with additives to produce the casting solution. Membranes can then be produced from the solution obtained. According to US 2006/156920, however, this procedure has the disadvantage that the films and membranes thus obtained are very brittle. It is accordingly proposed to produce blends of P84 and other polymers in order that stable films and hollow fibre membranes may be obtained. But the disadvantage with blends is that very good separation properties for gases, plasticization stabilities of P84 to $CO_2$ and chemical stabilities of P84 to many solvents are in part disruptively influenced, or even destroyed, by admixing other polymers.

It is noted in WO 2006/092677 that the powder of P84 type 70 and P84 HT has insufficient molar mass. It is accordingly proposed to subject the powder to a thermal treatment in order that a sufficiently high molar mass may be obtained. For this, the treatment time and the method are very important. The result is powders having slightly different properties but which produce casting solutions having different viscosities. Therefore, uniform production of polymer membranes is only possible with great difficulty. It was further found that membranes obtained by this method have insufficient thermal stability. This is because it transpires that the molecular weight increase achieved by annealing the powder is reversible. That is, employment of these membranes at comparatively high process temperature will result in an undesirable loss of molecular weight and thus in a deterioration in membrane properties.

In addition to the production of hollow fibre membranes, P 84 powder is also used for producing flat sheet membranes (WO 2007/125367, WO 2000/06293). The same problems and disadvantages have been encountered here as described above.

WO 2011/009919 discloses that the cause of the low molar mass of the P84 type 70 or P84 HT powder resides in the production process. It was found that the polymer loses molar mass as the polymerization solution is converted into the powder, i.e. by the precipitation process. It was accordingly proposed that the polymer not be isolated following the polymerization in the form of a solid material, particularly not as a dried solid material and more particularly not as a dried powder, but that the polymerization solution be used directly for producing the membranes. This method represents an appreciable simplification compared with the method of WO 2006/092677. Also, membranes having a distinctly narrower PDI are obtained. However, it has now transpired that the membranes obtained by the method of WO 2011/009919 also suffer a molecular weight degradation in the course of prolonged use at comparatively high temperatures.

A known way to stabilize the molecular weight of polyimide membranes, including P84 type 70 and/or P84 HT membranes, is by crosslinking the polymers by admixture of crosslinkers. However, this requires additional operations and, through the employment of crosslinkers as an additional component, increases the costs of the membrane and the complexity of the process.

WO 2006/068626 and EP 0321569 propose that polyimide membranes for separating mixtures of liquids be annealed at temperatures above 280° C. in vacuo in order that the selectivity of the membranes may be enhanced. However, it has transpired that, although the selectivity of the membranes obtained by these methods is good, their permeance is insufficient for commercial use. Also, problems were experienced in trying to replicate said patents in that the individual hollow fibre membranes became stuck together during annealing. The problem of separating gases is not broached in the abovementioned applications for a patent.

There is accordingly still a need for novel methods of producing polyimide membranes, in particular from P84 modifications, specifically from P84 type 70 and/or P84 HT, with high molecular weight and improved molecular weight stability.

OBJECT

This invention therefore has for its object to provide novel types of polyimide membranes as well as a method of producing same where the disadvantages of prior art membranes and methods are absent or much reduced.

The method is to be useful for membranes formed of P84 modifications, specifically of P84 type 70 and P84 HT, in particular, but also for similar polyimides.

It is a specific object of this invention for products to be obtainable by the method which have very good mechanical properties. Moreover, the membranes should combine very good permeance with very good selectivity so as to permit, compared with the prior art membranes, higher productivity, i.e. more efficient separation, in particular of gas mixtures.

It is a specific partial object of the present invention that the membranes exhibit little if any molecular weight degradation after several months of thermal exposure.

It is a further specific object of the present invention that the method be very simple to carry out and very little by way of substances extraneous to the polymer and/or with a crosslinking effect be incorporated in the polymer.

It is yet a further specific object of the present invention to provide polyimide membranes, in particular in P84 type 70 or P84HT, which, compared with the prior art, have an enhanced selectivity in the separation of $CH_4$ and $CO_2$.

It is finally a specific object of the present invention to provide a novel method leading to polyimide membranes having very good stability to higher hydrocarbons, i.e. aliphatic or aromatic hydrocarbons having more than 3 carbon atoms, in particular which are trace contaminants in natural gas, specifically pentane, hexane, heptane, benzene, toluene or xylene, and having very good plasticization resistance with regard to $CO_2$.

Further objects, not explicitly mentioned, will become apparent from the overall context of the ensuing description, examples and claims.

Solution to the Problem

The objects are achieved by a method according to claim 1 and/or by a polyimide membrane according to claim 11. Preferred embodiments are disclosed in the dependent claims and/or the ensuing description.

The inventors found that annealing polyimide membranes at temperatures in the range from 280° C. to the glass transition point of the polyimide in a gas atmosphere having an oxygen content of below 0.5% by volume gives membranes possessing very good permeance as well as a very high gas selectivity. It transpired in particular that these annealing conditions lead to membranes having a distinctly higher permeance at comparable selectivity and thus a distinctly higher productivity, compared with the annealing in vacuo as proposed in WO 2006/068626 for example.

The method of the present invention provides polyimide membranes having a freely adjustable DMF solubility in terms of temperature and time. Molecular weight degradation in the course of several months of thermal exposure is absent for the membranes thus treated or much reduced compared with the prior art.

It must be emphasized that this reduction in molecular weight degradation is achieved by the invention without use of substances extraneous to the polymer, such as crosslinkers for example, being incorporated in the polymer. The invention thus provides a very simple and economical method and improves the recyclability of the membrane, since varietal purity is increased.

It is further surprising that the process of the present invention delivers very good plasticization resistance with regard to $CO_2$ and chemical resistance to the membranes, which in some instances is actually better than in the prior art.

The described combination of positive properties on the part of the membranes according to the invention was unexpected against the background of the prior art. First, the previously discussed WO 2006/068626 and EP 0321569 documents relate exclusively to membranes for liquid/liquid separation; secondly, WO 2006/092677, which relates to gas separation, teaches at page 17, 1st paragraph, that "excessive annealing of P84 and P84HT leads to undesirable chain scissioning and therefore must be avoided". According to page 16, line 18 combined with page 17, line 3, WO 2006/092677 teaches that an annealing temperature of more than 250° C. is unsuitable.

It is not just that the prior art regarding gas separation membranes counsels against annealing at temperatures above 250° C., the prior art items WO 2006/092677 and WO 2011/009919 suggest annealing precursors in the membrane production process and not, as in the present invention, the final membrane. The results of the inventors were thus absolutely unforeseeable and unobvious against the background of the prior art.

The Invention

The present invention accordingly provides the method disclosed in the ensuing description, the examples and the claims and the membranes disclosed therein.

DETAILED DESCRIPTION OF THE INVENTION

Before the subjects of the invention are hereinbelow described in detail, some important terms will be defined first.

The terms "P84" and "P84 type 70" are used interchangeably in the context of the present invention and always differ from P84HT which, when meant, will always be explicitly referred to as such.

"Extraneous, crosslinking substances" in the context of the present invention are substances which become incorporated in the polymers, or attached to the polymer chain, via covalent bonds and which differ from the monomers used for producing the polymers, and/or the substances used for controlling the chain length, and/or the polymers used in producing those of the present invention, or the substances formed during the method of the present invention from the polymers already formed, for example as secondary or intermediate products. Examples thereof are crosslinkers which are used in the prior art in order that thermally stable membranes may be obtained.

By "the gas atmosphere surrounding the membrane" is meant in the context of the present invention that the membrane is surrounded during annealing by a gas or gas mixture or gas stream or stream of a gas mixture which is fed into the apparatus and has an oxygen content of less than 5% by volume, preferably having a pressure of not less than 5 mbar, more preferably of not less than 10 mbar, still more preferably of not less than 20 mbar, yet still more preferably not less than 30 mbar, yet still even more preferably not less than 100 mbar, further yet still more preferably not less than 500 mbar and most preferably not less than 1000 mbar absolute. The gas or gas mixture or gas stream or stream of a gas mixture can be introduced into the apparatus before and/or during the annealing. This atmosphere thus differs from any atmosphere created solely by evacuating air from the apparatus.

The method of producing polyimide membranes in the manner of the present invention comprises the steps of:
  a) producing a polyimide membrane from
    one or more than one dianhydride selected from the group consisting of 3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride, 1,1,1,3,3,3-hexafluoro-2,2-propylidenediphthalic dianhydride,
and
one or more than one diisocyanate selected from the group consisting of 2,4-tolylene diisocyanate, 2,6-tolylene diisocyanate, 4,4'-methylenediphenyl diisocyanate, 2,4,6-trimethyl-1,3-phenylene diisocyanate, 2,3,4,5-tetramethyl-1,4-phenylene diisocyanate, b) annealing the membrane from step a) at 280 to the glass transition temperature of the polymer, about 360-370° C., and is characterized in that
a gas atmosphere having an oxygen content of not more than 0.5% by volume, preferably an inert gas, more preferably nitrogen, of correspondingly low oxygen content surrounds the membrane during the anneal, and/or a corresponding gas stream sweeps around the membrane during the anneal.

The polyimide in step a) is preferably a polyimide of the following composition:

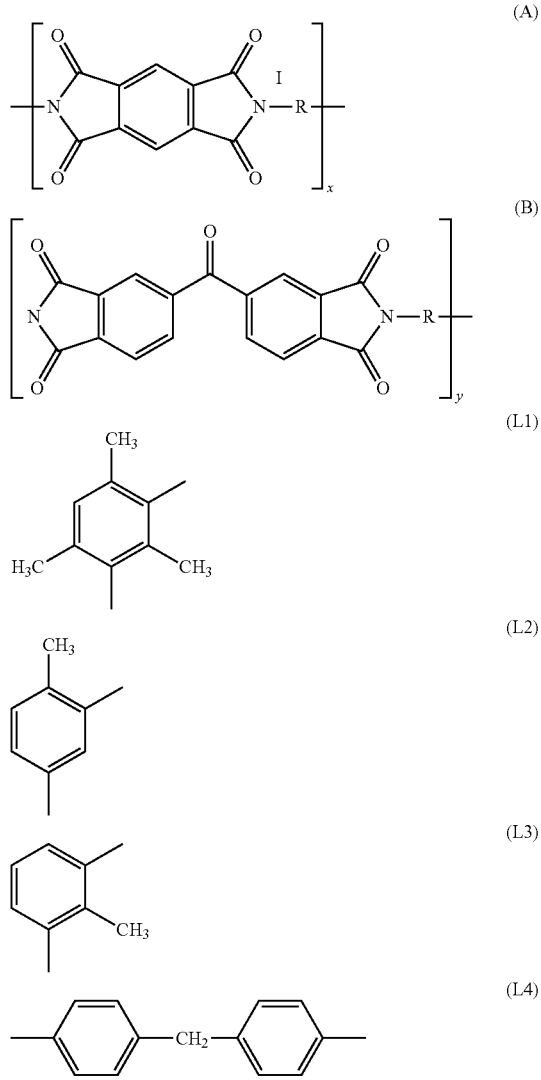

where $0 \leq x \leq 0.5$ and $1 \geq y \geq 0.5$ and R represents one or more, identical or different moieties selected from the group consisting of the moieties L1, L2, L3 and L4.

The polyimide is very particularly preferably a polymer where X=0, Y=1 and R consists of 64 mol % L2, 16 mol % L3 and 20 mol % L4. This polymer is commercially available under the name P84 or P84 type 70 and has the following CAS number: 9046-51-9. The specific preference in stage a) is for a polymer having the composition x=0.4, y=0.6 and R consists of 80 mol % L2 and 20 mol % L3. This polymer is commercially available under the name P84HT or P84 HT 325 and has the following CAS number: 134119-41-8.

The annealing conditions can be varied according to the property desired for the membranes. Membranes having a very good gas selectivity are obtained starting at a temperature of 280° C. At temperatures of more than 280° C. in the case of P84 type 70 and above 300° C. in the case of P84 HT, moreover, the molecular weight becomes stabilized, so the molecular weight stability can be established at these temperatures. In addition to the annealing temperature, the duration of the annealing step can also be used to influence the selectivity and the molecular weight stability. Without wishing to be tied to any one theory, the inventors believe that annealing the dried membrane causes the membrane structure to densify, specifically at the surface where the separating layer is. Selectivity is merely constrained by the intrinsic value of the polymer.

The examples proffered hereinbelow make it clear to a person skilled in the art which variation made has which effect on the product properties and how he or she may establish which property.

Annealing temperatures are preferably in the range from 280 up to 370° C., more preferably in the range from 285 to 360° C., even more preferably in the range from 290 to 350° C., still more preferably in the range from 300 to 340° C., yet still even more preferably in the range from 305 to 330° C. and most preferably in the range from 310 to 320° C.

The duration of the anneal—from the time at which the target temperature for the anneal is attained—is preferably in the range from 15 to 300 min, more preferably in the range from 30 to 240 min, even more preferably in the range from 30 to 90 and most preferably in the range from 60 to 90 min or 45 to 75 min.

Particularly preferred combinations of temperature and duration are 280 to 310° C., especially 285 to 295° C. and 30 to 90 min, especially 45 to 75 min, for P84 type 70.

Particularly preferred combinations of temperature and duration are 305 to 330° C., especially 310 to 320° C. and 30 to 90 min, especially 45 to 75 min, for P84 HT.

The heating rate chosen to attain the annealing temperature is preferably at from about 250° C. in the range from 0.1 to 10° C./min, more preferably 1 to 5° C./min and most preferably in the range from 1 to 2° C./min in order that heating may take place uniformly everywhere in the membrane bundle and in order that the final temperature may be attained at the same time. Particularly with the concurrent annealing of large amounts of fibres, a comparatively slow heating rate is advantageous in order that uniform heating of the fibres may be ensured.

The temperature of the atmosphere surrounding the membrane at a distance of up to 10 cm, preferably 2 to 10 cm, is measured with 3 or more sensors, preferably thermocouples. The mandated distance relates to the distance from the outer surface of the membrane when only one membrane is being annealed. When two or more membranes are being annealed concurrently, as for example with a membrane bundle or a stacked arrangement of membranes, the distance relates to the outer surface of a membrane fully on the outside, i.e. the distance to the outer surface of the membrane bundle or another membrane arrangement.

The inventors have found that the mechanical properties of the membranes and their productivity in particular are particularly good when the oxygen content of the atmosphere surrounding the membrane at a distance of up to 10 cm, preferably 2 to 10 cm, does not exceed a certain maximum value during the anneal. Preferably, therefore, the anneal takes place at an oxygen content of not more than 0.5% by volume, more preferably at not more than 0.25% by volume, even more preferably at not more than 0.1% by volume and yet even more preferably at not more than 0.01% by volume. It has further transpired that the oxygen content alone is not pivotal, but that particularly good results are obtained on annealing the membranes in a gas atmosphere or a gas stream of correspondingly low oxygen content and not in a vacuum, as in the prior art. Without wishing to be tied to any one theory, the experimental results suggest that the gas atmosphere and/or gas stream ensures a uniform distribution of temperature in the membrane bundle to be annealed and hence uniform annealing of all membranes (see also Comparative Example 2 hereinbelow).

Therefore, the membranes are surrounded by an atmosphere of correspondingly low oxygen content during the anneal and preferably at least in the first phase of cooling down, more preferably also during the heating up and/or to the end of the cooling down step. It is very particularly preferable for the membrane to be subjected during the abovementioned phases to a flow of a gas or gas mixture or gas stream or stream of a gas mixture, more preferably of at least one inert gas, for example a noble gas or nitrogen or sulphur hexafluorides or even more preferably nitrogen, having the abovementioned low oxygen content. It is most preferable to use a corresponding gas stream. During cooling, i.e. as soon as the temperature has dropped permanently below the maximum annealing temperature, it is also possible to apply a vacuum.

It is particularly preferable when after the beginning of the cooling down to temperatures of 200 to 275° C., more preferably 200 to 270° C., still more preferably 200 to 250° C. and yet still more preferably 200 to 220° C. the atmosphere surrounding the membrane at a distance of up to 10 cm, preferably 2 to 10 cm corresponds to the gas atmosphere described above and/or a vacuum is drawn. At lower temperatures, in particular below 200° C., the reactivity of the membranes is so low that contact with an oxygen-richer atmosphere would generally no longer cause any damage. Whether the annealing operation was successful, i.e. no undesired oxidation took place, is inter alia also ascertainable from the fact that the membrane has no visible (slightly orange) discoloration. Undesired oxidation can also be ascertained using FT-IR.

Cooling the membranes after annealing can be "passive", i.e. by switching off the heat source. However, it is particularly preferable for the membranes which have been completely annealed to be cooled down "actively", for example by flushing the oven or contacting the membrane with an appropriately temperature-regulated inert gas having the hereinbelow specified $O_2$ content. Alternatively, however, it is likewise preferable to cool with a heat exchanger and/or a cooling circuit. Further technical modulations to effectuate appropriate cooling are known to one skilled in the art and are encompassed by the present invention. Active cooling enhances the space-time yield and reduces the risk of yet still incurring an undesirable deterioration in membrane properties during cooling.

Step a) according to the invention can in principle be carried out according to any desired method of producing polyimide membranes. However, methods leading to membranes having a nanoporous structure are particularly preferred. When the membranes produced as a starting material for step b) already have a fairly thick separating layer or a dense structure, the anneal will effect a further improvement in their selectivity and prevent molecular weight degradation, but will also have the effect that the membranes are still further densified and thus a very thick separating layer is obtained. This in turn has the consequence that, although the membranes do have very good selectivity, they also have poor permeance and thus poor productivity. The effectivity of the method according to the present invention can thus be still further increased by producing in step a) a membrane which is characterized by a correspondingly high permeance. Permeance is a measure of the gas flux and thus an indicator of the structure of the membrane. The membranes produced in step a) of the method according to the present invention thus preferably have an $O_2$ permeance of not less than 25 GPU, preferably not less than 50 GPU, more preferably in the range from 100 to 2000 GPU, still more preferably from 200 to 1500 GPU, yet still more preferably from 300 to 1000 GPU and yet still even more preferably from 400 to 800 GPU. Corresponding membranes are preferably obtainable by the methods described hereinbelow.

In a first preferred embodiment, the membrane production process comprises in step a) the following sub-steps:
 a1) polymerization
 a2) producing the casting solution
 a3) membrane production
a1) Polymerization The polyimides used according to the present invention are produced via a polycondensation of one or more of the abovementioned aromatic tetracarboxylic anhydrides with one or more of the abovementioned aromatic diisocyanates by release of carbon dioxide.

The polymerization is preferably carried out in an aprotic dipolar solvent. Preferably but not exclusively, dimethylformamide, dimethylacetamide, N-methylpyrrolidone, N-ethylpyrrolidone and sulpholane are used, singly or in mixtures.

This preferably involves the aromatic dianhydride or mixtures of aromatic dianhydrides being dissolved in concentrations of 10% by weight to 40% by weight, preferably between 18% by weight and 32% by weight and more preferably between 22% by weight and 28% by weight in an aprotic dipolar solvent and heated to from 50° C. to 150° C., preferably 70° C. to 120° C. and more preferably to from 80° C. to 100° C. This solution is admixed with 0.01% by weight to 5% by weight, preferably 0.05% by weight to 1% by weight and more preferably 0.1% by weight to 0.3% by weight of a basic catalyst. Useful catalysts include:

Alkali or alkaline earth metal hydroxides, methoxides, ethoxides, carbonates and phosphates such as for example but not exclusively sodium hydroxide, potassium hydroxide, sodium methoxide, potassium methoxide, sodium ethoxide, potassium ethoxide, sodium carbonate, sodium bicarbonate, potassium carbonate, potassium bicarbonate, potassium phosphate, potassium hydrogenphosphate, potassium dihydrogenphosphate
 Tertiary amines such as for example but not exclusively: trimethylamine, triethylamine, tripropylamine, diazabicycloundecane, diazabicyclooctane, dimethylaminopyridine.

The diisocyanate is then preferably admixed over a period of 1 to 25 hours, more preferably 3 to 15 hours and even more preferably 5 to 10 hours.

The result thus obtained with the polymers used according to the present invention is a clear golden yellow to dark brown polymer solution having a viscosity between 1 and 300 Pa·s, preferably 20 to 150 Pa·s and more preferably 40 to 90 Pa·s. The molar masses Mp are preferably greater than 100000 g·mol$^{-1}$.

The method steps above provide the polyimide polymer of the present invention as a solute in an aprotic dipolar solvent. There are no disruptive concomitants or by-products in the polymer solution. The viscosity is very high and suitable for production of membranes. For that reason, it is also economically advantageous for the polymer not to be precipitated and then redissolved in the same solvent. The solutions are therefore preferably used directly—without isolating the polymer and preferably also without any other further treatment—for producing the casting solution.

a2) Producing the Casting Solution

The polymer solutions obtained from the polycondensation preferably have a solids content between 15% by weight and 35% by weight, more preferably between 22% by weight and 30% by weight and most preferably between 22% by weight and 29% by weight, and can be used for producing the casting solution without further treatment. The higher the solids content, the lower the permeance of the membrane. Since it is particularly preferable for membranes of high permeance to be produced in step a) of the present invention, it is particularly preferable to use solids contents of not more than 29% by weight.

The casting solutions of the present invention are notable for the following properties:

They have a sufficiently high viscosity for production of hollow fibre membranes They may contain additives to prevent the formation of large voids (macrovoids) in the membranes They may contain volatile solvents to produce a surface having the desired pore size Casting solution viscosity is ideal when it corresponds to the entanglement point in viscosity plotted as a function of solids content. This point is that point where the function of viscosity versus solids turns from linear to exponential. This point is also very highly dependent on molar mass. The higher the molar mass, the lower the solids content at which entanglement occurs.

In respect of viscosity, molar masses and molar mass distribution, the casting solutions obtainable by this method differ distinctly from casting solutions obtained from powders or pellets of the same polymer. This preferred embodiment thus has the advantage of making casting solutions obtainable which combine a high viscosity with a high molar mass and a narrow molar mass distribution for the polyimide. The method according to this first preferred embodiment thus makes it possible to obtain membranes that have outstanding mechanical properties.

It is also possible for additives to be admixed during the step of producing the casting solution. Various amounts of additives result in different solids contents, which would then shift the entanglement point. Modulating the molar mass in the polymerization can be used to shift this entanglement point again.

As the casting solution composition moves very far away from the concentration at which phase separation takes place, the gradient between solvent and nonsolvent becomes very large in membrane production by phase inversion, and large voids are obtained in the membranes. These voids, which are also known as macrovoids, are responsible for lower stability of the membranes to pressure in use, and limit their usefulness for example in use in natural gas cleanup. The formation of macrovoids can be prevented by addition of nonsolvents. Suitable for this are the following water-miscible solvents or mixtures thereof.

This list is only illustrative, the practised artisan will readily think of even more solvents.

alcohols such as for example methanol, ethanol, isopropanol, propanol, butanol, butanediol, glycerol, water, ketones such as for example acetone or butanone To produce a defined surface on the membrane, several methods can be used in principle. As well as the delayed demixing method, evaporative removal of volatile cosolvents will also lead to very thin selective layers not only in the gas separation membrane sector but also in the nano- and ultrafiltration membrane sector. The degree of evaporative removal and hence the pore size is influenced by the species of volatile solvent, its concentration, the evaporation time, the casting solution temperature, the amount and temperature of ambient gas in the evaporative removal zone.

Useful volatile solvents include the following. They should be water miscible, for example acetone, tetrahydrofuran, methanol, ethanol, propanol, isopropanol, dioxane, diethyl ether.

Producing the casting solution is preferably effected by adding additives by metered addition of the mixture of additives or separately from each other in succession. The additives are preferably gradually metered into the mixture under agitation. The metered addition takes between 10 min and 3 hours for preference and between 30 min and 2 hours for particular preference. Adding the cosolvents causes partial precipitation of polyimide at the drop entry point. But the solids dissolve again after a few minutes without leaving a residue. The clear solution is then preferably additionally filtered through a steel mesh sieve, more preferably of about 15 μm mesh width, in order to remove destructive concomitants which would lead to imperfections in the membrane surface.

After filtration, the solution is preferably devolatilized and freed of air bubbles. This is generally done by applying a negative pressure via a vacuum pump.

a3) Producing the Hollow Fibres

The devolatilized, filtered and optionally additized casting solution is preferably thermostated—preferably to from 20 to 100° C. and more preferably to from 30 to 70° C. The solution is then gear pumped, for example, through the outer part of a two-material die. The external diameter of the two-material die is preferably in the range from 500 to 800 μm, more preferably in the range from 550 to 750 μm, the internal diameter is preferably in the range from 200 to 400 μm, more preferably from 250 to 350 μm, and pump rate is preferably between 0.1 and 13.5 ml/min. A liquid mixture of water and one or more than one aprotic dipolar solvent in admixture is pumped in the inner part of the two-material die as bore solution.

Useful aprotic dipolar solvents include inter alia but not exclusively dimethylformamide, dimethylacetamide, N-methylpyrrolidone, N-ethylpyrrolidone, sulpholane or dimethyl sulphoxide, or combinations thereof. The composition as between solvent and water in the bore solution is preferably between 10% by weight and 95% by weight of solvent and 90% by weight and 5% by weight of water, more preferably between 30% by weight and 90% by weight of solvent and 70% by weight and 10% by weight of water and most preferably between 50% by weight and 80% by weight of solvent and 50% by weight and 20% by weight of water. Pump rate is more preferably between 1 ml/min and 10 ml/min.

The preferred distance between the spinning die and a precipitation bath of water, into which the hollow fibre is spun and an integrally asymmetrical hollow fibre membrane is formed by precipitating the polymer, is 1 cm to 1 meter, preferably 5 to 60 cm. As the solvent evaporates on the outer surface of the membrane, the layer densifies to form the separating layer on precipitation in the precipitation bath. The thickness of the separating layer can be adjusted via the distance from the spinning die to the precipitation bath and via the atmosphere of the membrane on its way from the spinning die to the precipitation bath. A person skilled in the art is able to determine the right distance for the desired property of the membrane via simple experiments.

As mentioned, it is particularly preferable for the membranes obtained in step a) of the method according to the present invention to have a high gas permeability, i.e. permeance. For this, the unannealed membrane should not have an excessively thick and/or excessively dense separating layer. This is achieved in a particularly preferred manner according to the present invention when in the course of the spinning process the hollow thread before entry into the precipitation bath is subjected to the flow of a dry thermostated stream of gas or air and/or is passed through a corresponding gas or air atmosphere. It is particularly preferable for the membrane to pass through a gas or air stream. Dry is to be understood as meaning that the gas or air stream is capable of taking up water. Therefore, the air or gas stream preferably has a water content of 0 to 90% relative humidity, preferably of 0 to 50% relative humidity and more preferably of 0 to 30% relative humidity at the particular air/gas temperature.

It is very particularly preferable for the hollow fibre emerging from the die to enter a shaft (tube) flooded with a dry thermostated gas. Useful gases include: nitrogen, air, argon, helium, carbon dioxide, methane or other industrial inert gases. Gas temperature is adjusted via a heat exchanger and is preferably between 20 and 250° C., more preferably between 25 and 120° C. and most preferably between 30 and 80° C.

Gas velocity in the tube is preferably between 0.1 and 10 m/min, more preferably between 0.3 and 5 m/min, even more preferably between 0.5 and 3 m/min and most preferably between 0.5 and 2 m/min. Tube length is preferably between 1 cm and one meter, more preferably between 2 and 50 cm, even more preferably between 5 and 40 cm and most preferably between 5 and 30 cm. Shaft length, gas velocity and the temperature all have an effect on the thickness of the actual separating layer of the membrane. To obtain a membrane having a high permeance and a low thickness for the actual separating layer in step a) of the method according to the present invention, compliance with the abovementioned ranges is preferable.

The thread thus conditioned then dips into a precipitation bath to coagulate the polymer mass and thus form the membrane. Bath temperature is preferably between 1 and 80° C., more preferably between 20 and 70° C. and most preferably between 40 and 65° C.

The concentration of aprotic dipolar and other solvents such as, for example, but not exclusively dimethylformamide, dimethylacetamide, N-methylpyrrolidone, N-ethylpyrrolidone, sulpholane, dimethyl sulphoxide, tetrahydrofuran, dioxane, isopropanol, ethanol or glycerol in the precipitation bath is preferably between 0.01% by weight and 20% by weight, more preferably between 0.1% by weight and 10% by weight and most preferably between 0.2% by weight and 1% by weight, the remainder being water. It is likewise preferable to use pure water in the water bath.

The haul-off speed of the hollow fibres is preferably between 2 and 100 m/min, more preferably between 10 and 80 m/min and most preferably between 30 and 70 m/min. It has transpired that an excessively high haul-off speed leads to a loss of permeance. Nonetheless, the method which is preferred according to the present invention may preferably be operated at a high haul-off speed to thereby achieve improved productivity compared with the prior art.

The fibres are preferably washed at a point downstream of the precipitation bath until the residual solvent content is below 1% by weight, preferably not more than 0.5% by weight. Various techniques of washing can be used for this. It is preferable to use a continuous process whereby the fibres pass through one or more successive water baths. It is particularly preferable to heat the water baths to 40-90° C., preferably 50-80° C., to achieve a more effective wash.

However, it is also possible for the fibres obtained from the precipitation bath to be wound up on a bobbin and be washed in water off-line. The wash can take place at any temperature. Preferably, however, comparatively high temperatures are used for the wash as described above. It is preferable to direct the water in cross-flow along the fibres, i.e. to force it from the inside surface of the bobbin to the outside.

This is preferably followed by a solvent exchange, more preferably in isopropanol and/or hexane, to remove water and DMF. The solvent exchange can be carried out as a continuous operation (on-line) or off-line, like the wash. For an on-line solvent exchange, the fibres are led through one or more solvent baths, preferably downstream of the wash bath(s).

The fibres are then dried—preferably at a temperature in the range from room temperature and 150° C., more preferably between 50 and 100° C., removing isopropanol and hexane. The overall water and/or residual solvent content after drying is in the range from 0% to 5% by weight, preferably <3% by weight and more preferably in the range from 0.1% to 3% by weight, and preferably consists of the water, isopropanol and hexane fractions. It has transpired that a low residual solvent and water content offers additional advantages for the anneal. As shown in Comparative Example 4, an excessively high residual content level of water and solvent in the annealing of entire membrane bundles causes the membranes to stick together. Therefore, it is not possible for entire membrane bundles to be annealed when the residual content is too high. Instead, the membranes would have to be annealed individually at additional expense and inconvenience. There is moreover a risk with this of resultant inhomogeneities in the membrane bundle due to variations with the annealing of individual membranes. As shown in Comparative Example 4, the short drying in EP 0321569 is completely insufficient in that the membrane bundle became stuck together.

Too much water can further lead to hydrolysis and hence chain scissioning and thus to a mechanically unstable membrane. Although some of the water and some of the solvent will evaporate during annealing, it has been determined that the maximum content before commencement of annealing is advantageously below 5% by weight, preferably below 3% by weight.

It may be preferable in the method of the present invention to treat the membranes with a silicone-type elastomer such as, for example, Sylgard® 184 after drying to repair possible defects.

Step a) preferably produces fibres having external diameters of 100 to 1000 μm, preferably between 200 and 700 μm and more preferably between 250 and 400 μm.

The hollow fibre membranes thus obtained are subsequently subjected to the method step b) annealing explained above in detail.

Details regarding the production of membranes with steps a1) to a3) can be extracted from WO 2011/009919, the content of which is hereby explicitly incorporated in the description of the present invention by reference.

In an alternative preferred embodiment of the present invention, step a) comprises first producing a casting solution from a polyimide powder, which is preferably dried, and producing the membrane from said casting solution. This method is admittedly more involved than the above-explained method of the first preferred embodiment, but production from the powder has the converse advantage of enabling even producers without polyimide polymerization facilities of their own to carry out the method of the present invention and produce membranes of the present invention.

In this second preferred embodiment, the method comprises within step a) the sub-steps of:
  aI) providing an optionally annealed polyimide polymer of the present invention in the form of a preferably dried solid material, preferably in the form of a powder or in the form of a pellet material,
  aII) producing a casting solution, wherein this casting solution comprises a solvent and the solid material from step aI); and
  aIII) forming a hollow fibre membrane.

Step aI) can utilize a commercially available polyimide powder or pellet material, e.g. P84 type 70 or P84 HT from Evonik Fibres. It is also possible first to produce a polyimide as explained in the above method in step a1) and then to isolate and dry the solid material.

Commercially available polyimides can be used directly for producing membranes. However, it can be advantageous for the polyimide to be dried and/or annealed, at a temperature of 50-250° C., preferably 100 to 200° C., preferably for a period of 6-30 hours, more preferably 10 to 16 hours, before step aII). The annealing and/or drying step can be conducted as mechanical annealing/drying, thermal drying/annealing or a combination thereof. The drying/annealing can be carried out in a vacuum or under inert gas flushing. Depending on the polyimide powder used, molecular weight increase can occur in the process. Gelling can occur with too high a choice of temperature or too long an annealing time. This should be avoided, since otherwise it is no longer possible to produce a casting solution. A person skilled in the art, however, will recognize the onset of gellation and will lower the temperature until no gelling takes place.

Annealing is preferably conducted as policed annealing wherein time and temperature are policed to control the intended molecular weight increase.

A preferred procedure is characterized in that a commercially available polyimide powder is heated in an oven or rotary tube dryer. The temperature chosen is preferably in the range from 100 to 250° C. and more preferably in the range of 140-180° C. The oven or rotary tube dryer is preferably evacuated down to a vacuum of not less than 0.5 bar, more preferably not less than 0.6 bar and even more preferably 0.6 to 0.9 bar. Annealing preferably takes from 6 to 30 hours and more preferably from 10 to 16 hours. Optionally, the anneal can be carried out in an inert gas stream.

The solid material as per step aI) in this embodiment is subsequently used in step aII) to produce a casting solution according to methods known per se to a person skilled in the art.

The production of the hollow fibre membrane from the casting solution in step aIII) is known per se. The production is preferably carried out as described in the above method under a3).

An integrally asymmetrical hollow fibre membrane is preferably produced in steps a3) or aIII), wherein the hollow fibre is especially preferably spun from a polyimide casting solution and a bore solution in a continuous process using a two-material die.

The polyimide membranes of the present invention are thus characterized in that
  the polyimide is a polyimide comprising
    one or more than one dianhydride selected from the group consisting of 3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride, 1,1,1,3,3,3-hexafluoro-2,2-propylidenediphthalic dianhydride,
    and
    one or more than one diisocyanate selected from the group consisting of 2,4-tolylene diisocyanate, 2,6-tolylene diisocyanate, 4,4'-methylenediphenyl diisocyanate, 2,4,6-trimethyl-1,3-phenylene diisocyanate, 2,3,4,5-tetramethyl-1,4-phenylene diisocyanate, and
    in that
  the level of extraneous and crosslinking substances in the membrane is in the range from 0% to 5% by weight, preferably 0% to 1% by weight,
  they have a solubility in DMF of 5 to 95%, preferably 5 to 90%, more preferably 10 to 80% and still more preferably 20 to 70%
  and
  they have a layer thickness of the actual separating layer of not more than 1.5 μm, preferably not more than 1 μm, more preferably not more than 750, still more preferably not more than 500 nm, yet still more preferably not more than 250 nm and yet still even more preferably not more than 100 nm.

The polyimide is preferably a polyimide disclosed as preferable above in the description of the production method.

As mentioned, the method of the present invention is the first successful way of providing membranes combining very high gas selectivity with very good productivity and a high molecular weight stability under thermal stress. The membranes annealed according to the present invention can be varied in DMF solubility by means of the method according to the present invention and so differ in this respect as well from the unannealed membranes of the prior art which are completely DMF-soluble unless crosslinkers, i.e. extraneous substances, are added.

The special feature of the membranes according to the present invention is that thermal stability and insolubility in DMF are obtained without incorporation of extraneous substances, i.e. polymers not in accordance with the present invention in a blend or copolymer (as recommended in the prior art) or crosslinkers (likewise prior art).

However, in principle, the method of the present invention can also be used to produce a blend, preferably of polymers of the present invention, and then anneal it.

As mentioned, the membranes of the present invention have a distinctly thinner separating layer than those of the prior art. They nonetheless have at least comparable selectivity. However, the permeance of membranes according to the present invention and thus their productivity are very much superior to those of prior art membranes.

The hollow fibre membranes concerning the invention can be not only porous membranes in the form of micro-, ultra- or nanofiltration membranes but also—as described in the preferred variants of the method—aporous membranes for separation of gases. All the membranes are integrally asymmetrical membranes and are produced by a phase inversion method. The membranes in question are more preferably gas separation membranes and even more preferably hollow fibre gas separation membranes.

The polyimide membranes of the present invention are preferably used for separating methane and carbon dioxide and/or for separating oxygen and nitrogen and/or for separating hydrogen from process gases and/or for separating water vapour and/or helium from gases or gas mixtures of various kinds.

Analysis

Viscosity Determination

Dynamic viscosity η is ascertained by shearing the polymer solution in a cylindrical gap at a constant temperature of 25° C. once by mandating various rotation rates Q (or shear gradients γ), is specifically measured at the shear gradient 1.25; 2.5; 5.0; 10.0; 20.0; and 40.0 1/s and then ascertained by shear stresses τ of 2250 to 100 Pa of in each case 10 s.

The measuring instrument used is a HAAKE RS 600 with a liquid-heatable measuring cup receiver TEF/Z28, a cylindrical rotor Z25DIN53019/ISO3219 and a disposable aluminium measuring cup Z25E/D=28 mm.

Dynamic viscosity η computes from ensuing formulae and is reported at a shear gradient of 10 s$^{-1}$ in Pa·s.

Viscosity function proper $$\frac{\tau}{\gamma} = \eta * \gamma^2$$

Shear gradient γ=M*Ω

τ . . . Shear stress
η . . . Dynam. viscosity
M . . . Shear factor of rotor: 12350 rad/s
Ω . . . Angular velocity Molar Mass Determination Molar mass is determined using a gel permeation chromatography system. The system is calibrated with polystyrene standards. The molar masses reported are therefore to be understood as relative molar masses.

Components and settings used were as follows:

TABLE 1

| | |
|---|---|
| HPLC | WATERS 600 pump, 717 autoinjector, 2487 UV detector |
| Precolumn | PSS SDV precolumn |
| Columns | PSS SDV 10 μm 1000, $10^5$ and $10^6$ Å |
| Eluent | 0.01M LiBr + 0.03M $H_3PO_4$ in DMF (sterile-filtered, 0.45 μm) |
| Flux | 1.0 ml/min |
| Run time | 45 min |
| Pressure | ~1.550 psi |

TABLE 1-continued

| | |
|---|---|
| Wavelength | 270 nm (with use of UV detector) |
| Injection volume | 50 μl or 20 μl (for solutions c >1 g/l) |
| Standards | PS (polystyrene) standards (narrow distribution, 300-3*$10^6$, PSS) |

Permeabilities

Gas permeabilities are reported in barrers ($10^{-10}$ cm$^3$·cm$^{-2}$·cm·s$^{-1}$·cmHg$^{-1}$) Permeances of hollow fibre membranes to gases are reported in GPU (Gas Permeation Unit, $10^{-6}$ cm$^3$·cm$^{-2}$·s$^{-1}$·cmHg$^{-1}$) The fluxes of nano- and ultrafiltration membranes are reported in l·m$^{-2}$·h$^{-1}$·bar$^{-1}$.

Gas Permeabilities

Permeabilities to gases are measured by the pressure rise method. A flat sheet film between 10 and 70 μm in thickness has a gas or gas mixture applied to it from one side. On the other side, the permeate side, there is a vacuum (ca. $10^{-2}$ mbar) at the start of the test. Then, pressure rise on the permeate side over time is recorded.

The polymer's permeability can be computed by the following formula:

$$P = \frac{V_{dead} \cdot MW_{gas} \cdot l}{\rho \cdot R \cdot T \cdot A \cdot \Delta p} \cdot \frac{dp}{dt} \cdot 10^{10}$$

P . . . Permeability in barrers ($10^{-10}$ cm$^3$·cm$^{-2}$·cm·s$^{-1}$·cmHg$^{-1}$)
$V_{dead}$ . . . Volume of permeate side in cm$^3$
$MW_{gas}$ . . . Molar mass of gas in g·mol$^{-1}$
l . . . Thickness of film in cm
ρ . . . Density of gas in g·cm$^{-3}$
R . . . Gas constant in cm$^3$·cmHg·K$^{-1}$·mol$^{-1}$
T . . . Temperature in kelvins (room temperature, ~23° C.)
A . . . Area of film in cm$^2$ (~12 cm$^2$)
Δp . . . Pressure difference between feed and permeate side in cmHg
dp/dt. Pressure rise per time on permeate side in cmHg·s$^{-1}$ The permeance of hollow fibres is measured using a volume rise method.

Permeance P/l (since the thickness of the separating layer is unknown) is computed by the following formula:

$$P/l = \frac{Q(STP)}{R \cdot T \cdot A \cdot \Delta p} \cdot 10^6$$

P/l . . . permeance in GPU (gas permeation units. $10^{-6}$ cm$^3$·cm$^{-2}$·s$^{-1}$·cmHg$^{-1}$)
Q . . . gas flux of permeate side in cm$^3$ (STP)/s
R . . . gas constant in cm$^3$·cmHg·K$^{-1}$·mol$^{-1}$
T . . . temperature in kelvins (room temperature, ~23° C.)
A . . . external area of hollow fibre in cm$^2$ (between 60 and 80 cm$^2$)
Δp . . . pressure difference between feed and permeate side in cmHg
dp/dt. pressure rise per time on permeate side in cmHg·s$^{-1}$ The selectivities of various pairs of gases are pure-gas selectivities. The selectivity between two gases calculates from the ratio of permeabilities:

$$S = \frac{P_1}{P_2}$$

S . . . ideal gas selectivity
P$_1$ . . . permeability or permeance of gas 1
P$_2$ . . . permeability or permeance of gas 2

Determination of DMF Solubility

To determine DMF solubility, a 20 mg quantity each of the annealed and of the unannealed polymer/membrane is introduced at room temperature into 10 ml of DMF and left therein for 4 h without stirring. The unannealed polymer/membrane dissolves in full. In the case of the annealed polymer/membrane, any residue which may be present is filtered off. Both solutions are then analysed by GPC to determine the molar mass distribution as explained above. The solubility is calculated on the basis of the hydrodynamic volume of the polymer chains, from the ratio of the area of the molar mass distribution obtained for the annealed polymer to the area of the completely soluble unannealed polymer.

Determination of Residual Solvent Content

The residual solvent (e.g. isopropanol, hexane) is determined via gas chromatography by headspace injection of the polymer dissolved/dispersed in 1,3-dimethyl-3,4,5,6-tetrahydro-2(1H)-pyrimidinone (DMPU).

A 250-300 mg quantity of the sample is weighed out accurately to 0.1 mg (=initial weight) into a tared vial. Then, 5.00 ml of DMPU are added using a full pipette or a Dispensette and the vial is sealed with the septum using the cap crimper. The sample is thermostated to 120° C. in the headspace sampler for 90 min, which is followed by headspace injection onto the GC column.

Residual DMF of the moist hollow fibre sample is determined by Soxhlet extraction in ethanol. Subsequent quantification is by direct injection of the extract onto GC. Residual DMF of the dry hollow fibre sample is determined using headspace GC.

GC: Perkin Elmer AutoSystem XL
Column: Perkin Elmer WAX ETR, 30 m×0.53 mm, df=2.00 µm, #N931-6570
Headspace autosampler: Perkin Elmer TurboMatrix 40
Carrier gas: 5 ml helium 4.6 (or better)
FID detector gases: 40 ml/minute hydrogen, 400 ml/min synthetic air
Temperature programme of GC:
Init. temp.: 175° C. for 3 minutes,
Ramp1: 20°/min to 230° C. for 3 minutes
Run time: 8.75 minutes
Cycle time: 15 minutes After effected analysis, the residual solvent content is automatically computed according to the formula $$\frac{area}{cal.curve \cdot initial\,weight\,[mg]} \cdot 100 = residual\,solvent(\%)$$

and printed out under "Concentration [%]".

Determination of Residual Water Content

Residual water content is determined by extracting the membranes with isopropanol and a subsequent analysis by Karl Fischer titration. The membranes are transferred into a previously dried 250 ml Schott glass and covered with a weighed-out amount of dry isopropanol up to the top. The container is left to stand at room temperature overnight.

PRODUCTION EXAMPLES

The examples which follow serve to provide more particular elucidation and better understanding of the present invention, but do not limit it in any way.

Example 1

To produce the spinning solution, a 3 l glass flask equipped with a stirrer and reflux condensers was initially charged with 1800 g of anhydrous dimethylformamide. 316.4 g of 3,3',4,4'-benzophenonetetracarboxylic dianhydride and 142.8 g of pyromellitic dianhydride were dissolved therein and the solution was heated to 80° C. 1.8 g of diazabicyclooctane were added to this solution. Under nitrogen, 283.4 g of a mixture of 80% 2,4-tolylene diisocyanate and 20% 2,6-tolylene diisocyanate are metered in during several hours. In the process, $CO_2$ escaped as a by-product and a polyimide is obtained directly in solution.

The resultant 27% by weight spinning solution in DMF was then devolatilized, thermostated to 50° C. and gear pumped through a two-material die. The flow rate was 324 g/h. While the polymer solution was conveyed in the outer region of the two-material die, a mixture of 70% dimethylformamide and 30% of water was conveyed as bore solution in the inner region in order to produce the hole in the hollow fibres. The flow rate of the bore solution was 120 ml/h. After a distance of 13 cm from the die, the hollow fibre entered warm water at 50° C. The hollow fibre travelled through a tube on the way from the die to the precipitation bath. This tube was flooded with a 1 l/min stream of nitrogen, tube internal temperature was 35° C. The fibre was hauled through the water wash bath and finally wound up at a speed of 50 m/min. After extraction with water for several hours, the hollow fibres were dipped into isopropanol. After solvent exchange, the membranes were led at 70° C. through a drying zone and dried within about 40 seconds. The membranes obtained contain about 2% by weight of residual water, ≤0.5% by weight of residual solvent (isopropanol, hexane) and <0.1% by weight of residual DMF, and were heated at a rate of 0.2° C./min to 300° C. temperatures according to the invention in a vacuum of 30 mbar absolute ($N_2$ flushed, $O_2$ content <0.001% by volume) and subsequently left at the final temperature for 2 h.

It was ascertained that the molecular weight Mp of the membranes was 102 kDa following the annealing according to the invention and also after 3 months of storage. The membranes according to the invention are thus thermally stable and are free of molecular weight degradation even after several months of storage.

Comparative Example 1

Hollow fibre membranes were produced and annealed as in Example 1. In contrast to Example 1, however, the annealing temperature was reduced to 265° C. and/or 250° C. The results of the tests are found below in Table 2:

TABLE 2

| Duration of | Mp (kDa) | |
|---|---|---|
| annealing | day 1 | after 3 months |
| unannealed | 102 | 88 |
| 250° C. | 86 | 82 |
| 265° C. | 85 | 80 |

Table 2 shows that, in contrast to Example 1, storage stability is insufficient if an anneal is not carried out in accordance with the present invention, i.e. at excessively low temperatures.

Example 2

To further illustrate the effect of the annealing temperature, several membranes were again produced as per Inventive Example 1. However, the heating rate used in the anneal was raised to 5° C./min. The membranes were heated under an $N_2$ atmosphere having an $O_2$ content of 0.001% by volume, to temperatures of 290 to 320° C. The membranes obtained were tested for DMF solubility, $CO_2$ permeance, $CO_2/CH_4$ selectivity and mechanical properties, the results being summarized in Table 3.

TABLE 3

| Final temperature (° C.) | DMF solubility (%) | $CO_2$ permeance (GPU) | $CO_2/CH_4$ selectivity |
| --- | --- | --- | --- |
| unannealed | 100 | ~500 | <2 |
| 300 | 90 | 41.4 | 63.9 |
| 310 | 70 | 29.0 | 87.8 |
| 320 | 40 | 20.1 | 75.6 |

It transpired that the anneal had a distinctly enhancing effect on the selectivity, compared with the unannealed membranes. Permeance is very good in all examples. DMF solubility and hence chemical resistance can likewise be controlled via the choice of annealing temperature without having to incur any significant reduction in selectivity. Mechanical properties were not adversely affected by the temperature.

Example 3

This example, in contrast to Example 2, is designed to demonstrate the effect of the duration of the anneal, not the effect of the annealing temperature. To illustrate the effect of the duration of the anneal, several membranes were again produced and annealed as described in Inventive Example 1. The final temperature of the anneal was kept at a constant 310° C. or 320° C. while the duration of the anneal was varied. The membranes obtained were tested for DMF solubility, and the results are summarized in Table 4.

TABLE 4

| Final temperature (° C.) | Duration (min) | DMF solubility (%) |
| --- | --- | --- |
| 310 | 30 | 70 |
| 310 | 60 | 70 |
| 310 | 90 | 31 |
| 310 | 180 | 23 |
| 310 | 240 | 17 |
| 320 | 90 | 18 |
| 320 | 240 | 11 |

Table 4 shows that chemical resistance can be varied via the duration of the anneal as well as the annealing temperature.

Example 4

This example shows the effect of the oxygen content of the atmosphere which surrounds the membrane during annealing. Example 1 was repeated for this except that the annealing conditions in each case were 1 h at 310° C.

Three annealing runs were carried out:
Example 4 invention: with a 0.1% by volume oxygen content of $N_2$ purge gas
Example 4 comparator 1: 1% by volume oxygen content of $N_2$ purge gas
Example 4 comparator 2: 5% by volume oxygen content of $N_2$ purge gas The membranes obtained were tested for $CO_2/CH_4$ selectivity and tensile strength. The results are found below in Table 5

TABLE 5

| | $CO_2/CH_4$ selectivity | Elongation in % |
| --- | --- | --- |
| Example 4 as per the invention | 111.9 | 26.51 |
| Example 4 comparison 1 (not as per the invention) | 26.8 | 20.09 |
| Example 4 comparison 2 (not as per the invention) | not determined | 20.66 |

The results in Table 5 show that a low oxygen content of the atmosphere directly surrounding the membrane is essential for good selectivity and good mechanical properties on the part of the membrane in the method of the present invention.

Comparative Example 2

This example shows that the anneal in an evacuated oxygen-free atmosphere, as taught in the prior art item WO 2006/068626, has distinct disadvantages by comparison with the method of the present invention, which comprises annealing in a gas atmosphere having a low oxygen content.

Example 4 was repeated except the annealing conditions were 1 h at 310° C. in vacuo. This was followed by measurement of the $O_2$ permeance and the $O_2/N_2$ selectivity.

Table 6 below contains the results of Comparative Example 2 and, for comparison, those of a membrane obtained according to Example 4 as per the invention:

TABLE 6

| | $O_2/N_2$ selectivity | $O_2$ permeance [GPU] |
| --- | --- | --- |
| Example 4 as per the invention | 7.9 | 7.6 |
| Membrane of Comparative Example 2 | 7.9 | 2.6 |

The results in Table 6 show that the method of WO 2006/068626, as correctly averred therein, does lead to good selectivity. Yet the permeance of the vacuum-annealed membranes of WO 2006/068626 is approximately 300% worse. Therefore, the membranes annealed by the method of the prior art are not fit for commercial purposes.

It was also noticed that the vacuum-annealed hollow fibre membranes were very badly discoloured, their colours ranging from yellow to brown. A brown colour is indicative of considerable densification and is presumably caused by a bad temperature distribution in the vacuum. This observation corresponds to the permeance data in Table 6. Therefore, a vacuum is clearly not a suitable annealing medium.

Example 5

This example shows that the method of the present invention can also be carried out with blends of two polyimides of the present invention. To this end, a 27% spinning solution was produced of a blend of two polyimides in DMF wherein 95% of polyimide 1 was mixed with 5% of polyimide 2.

To produce polyimide solution 1 in DMF, a 3 l glass flask equipped with a stirrer and reflux condensers was initially charged with 1622 g of anhydrous dimethylformamide. 456.4 g of 3,3',4,4'-benzophenonetetracarboxylic dianhydride were dissolved therein and the solution was heated to 85° C. 0.45 g of comminuted sodium hydroxide were added to this solution. Under nitrogen, 266.8 g of a mixture of 80% 2,4-tolylene diisocyanate and/or 2,6-tolylene diisocyanate and 20% 4,4'-diphenylmethane diisocyanate are metered in during several hours. In the process, $CO_2$ escaped as a by-product and a polyimide is obtained directly in solution.

To produce polyimide solution 2 in DMF, a 3 l glass flask equipped with a stirrer and reflux condensers was initially charged with 1800 g of anhydrous dimethylformamide. 316.4 g of 3,3',4,4'-benzophenonetetracarboxylic dianhydride and 142.8 g of pyromellitic dianhydride were dissolved therein and the solution was heated to 80° C. 1.8 g of diazabicyclooctane are added to this solution. Under nitrogen, 283.4 g of a mixture of 80% 2,4-tolylene diisocyanate and 20% 2,6-tolylene diisocyanate are metered in during several hours. In the process, $CO_2$ escaped as a by-product and a polyimide is obtained directly in solution.

The polyimide solutions were mixed together in a cat can and homogenized on a rollstand over the weekend. This gave a bulk viscosity of 79 Pas at 25° C. and a solids content of 27.8%.

The casting solution thus obtained was devolatilized, thermostated to 50° C. and gear pumped through a two-material die. The flow rate was 324 g/h. While the polymer solution was conveyed in the outer region of the two-material die, a mixture of 70% dimethylformamide and 30% of water was conveyed as bore solution in the inner region in order to produce the hole in the hollow fibres. The flow rate of the bore solution was 120 ml/h. After a distance of 13 cm from the die, the hollow fibre entered warm water at 50° C. The hollow fibre travelled through a tube on the way from the die to the precipitation bath. This tube was flooded with a 1 l/min stream of nitrogen, tube internal temperature was 35° C. The fibre was hauled through the water wash bath and finally wound up at a speed of 50 m/min. After extraction with water for several hours, the hollow fibres were dipped into isopropanol and thereafter dried at 70° C. in a drying zone. The membranes obtained contain less than 2% by weight of water, ≤0.5% by weight of residual solvent (isopropanol, hexane) and 0.1% by weight of residual DMF, and were heated at a rate of 2° C./min to 310° C. in $N_2$ ($O_2$ content of 0.001%) and subsequently left at the final temperature for 1 h.

The membranes obtained had a CO2 permeance of 27 GPU and a $CO_2/CH_4$ single gas selectivity of 93. A DMF solubility of about 70% was measured. These results confirm that the method of the present invention also works with a blend of various polyimides.

Example 6

Inventive Example 5 was repeated without the second polyimide solution. The hollow fibre membranes obtained contained, after drying, less than 2% by weight of water, ≤0.5% by weight of residual solvent (IPA, hexane) and ≤0.1% by weight of residual DMF and were heated to 280 and/or 290° C. in $N_2$ at a rate of 2° C./min and then left at the final temperature for 1 h.

Table 7 shows the results of permeance measurements. Table 8 shows mechanical properties and the measured solubility.

TABLE 7

| Final temperature (° C.) | CO2 permeance (GPU) | CO2/CH4 selectivity |
|---|---|---|
| 280 | 23.8 | 28.7 |
| 290 | 10.1 | 54.6 |

TABLE 8

| Final temperature (° C.) | Tenacity (cN/tex) | Extension (%) | DMF solubility (%) |
|---|---|---|---|
| 280 | 5.98 | 32.67 | 74 |
| 290 | 5.71 | 29.89 | 58 |

The results show that even with the polymer used here—corresponding to P84 type 70 in this example—crosslinked, highly selective and productive membranes are obtainable by the process of the present invention, i.e. without addition of crosslinkers.

Comparative Example 3

After it was shown in Comparative Example 2 that the annealing method of WO 2006/068626, i.e. annealing in vacuo, is distinctly inferior to that of the present invention, what is shown here is that this also holds for the method of EP 0321569.

A membrane was obtained as per above Example 6 and annealed as follows in accordance with Example 20 of EP 0321569 (in air throughout):

30 min at 100° C.

heating to 200° C.

heating from 200 to 320° C. within 16 min maintain at 320° C. for 14 min and allow to cool down naturally.

Table 9 below contains the results from Comparative Example 3 and, for comparison, those of a membrane obtained according to Example 6 as per the invention and annealed as follows as per the invention (heating rate 2° C./minute from 250 to 290° C., 1 h at 290° C. in an $O_2$-free $N_2$ atmosphere):

TABLE 9

|  | Annealed | | | | Unannealed | |
|---|---|---|---|---|---|---|
|  | $O_2$ perm. [GPU] | $O_2/N_2$ sel. | Tenacity [cN/tex] | Breaking extension [%] | $O_2$ perm. [GPU] | $O_2/N_2$ sel. |
| Example 6 as per the invention | 2.00 | 5.9 | 6.9 | 34 | 916 | 1.3 |
| membrane of Comparative Example 3 | 0.68 | 1.1 | 6.5 | 31.7 | 916 | 1.3 |

Table 9 shows that the anneal according to the method of the present invention leads to an approximately 5.5 times better selectivity and an approximately 3 times better permeance—even though a distinctly lower annealing temperature was employed. The mechanical properties of the membranes annealed according to the present invention are likewise distinctly better.

Comparative Example 4

This comparative example goes even further than Comparative Example 3 in showing that the already very positive effect due to the annealing method of the present invention can be still further enhanced by employing a preferred production method of the present invention for the membrane to be annealed.

An unannealed membrane obtained by a production method which is preferred according to the present invention was annealed in Comparative Example 3. Therefore, only the annealing conditions of EP 0321569 were adopted. Comparative Example 4, then, was carried out completely in accordance with EP 0321569 in that a membrane was obtained in step a) as per Example 1 of EP 0321569 and then annealed as described in Comparative Example 3. To this end, a 25% solution of P84 type 70 in DMF was obtained as per Reference Preparation Example 1 of EP 0321569. The spinning conditions were as follows:

2.4 ml/min spinning solution; 0.86 ml/min bore fluid
residence time in precipitation bath=8-10 s; precipitation bath unheated (27° C.)
bore fluid 50/50 DMF/H$_2$O
no spinning cell, instead 12 cm air gap
membranes are immersed for 10 min in container of water
membranes are air dried for 24 h without solvent exchange Annealing was carried out as in Comparative Example 3. The following results were obtained:

TABLE 10

|  | Annealed | | | | Unannealed | |
| --- | --- | --- | --- | --- | --- | --- |
|  | O$_2$ perm. [GPU] | O$_2$/N$_2$ sel. | Tenacity [cN/tex] | Breaking extension [%] | O$_2$ perm. [GPU] | O$_2$/N$_2$ sel. |
| membrane of Comparative Example 4 | 0.09 | 3.2 | 6.2 | 11.3 | 6.2 | 0.8 |

Comparing the data in Table 10 with those in Table 9 shows that the production method for the unannealed membranes in EP 0321569 already leads to severely densified membranes having a poor permeance. Further annealing these membranes by the poor annealing method of the prior art gives membranes that have a 20 times worse permeance than those obtained by the method according to the invention. The situation is similar as regards tenacity and breaking extension.

This comparative example accordingly shows that even the annealing method of the present invention alone is sufficient to effect an appreciable improvement in the permeance and hence productivity of membranes. If, then, the methods which are preferred according to the present invention are used to produce unannealed membranes of mesoporous structure, i.e. with a high permeance, membranes are obtained with a combination of selectivity and permeance, i.e. productivity, which are even more superior to those of the prior art.

In the context of this comparative example, it was also observed that the wash in EP 0321 569 was much too short and there was accordingly still too much residual solvent in the membranes prior to annealing. The annealing of membrane bundles as per EP 0321 569 led to stuck-together clumps in the membrane bundle, so the membranes had to be annealed individually.

Example 7

The membranes of the present invention not only have distinctly superior performance characteristics than the membranes of the prior art, they also differ structurally. The membranes of the present invention are the first successful production of membranes which—without addition of a crosslinker—have chemical resistance combined with high productivity. The structural parameters responsible for this are:

DMF solubility (for resistance to molecular weight degradation)
thickness of actual separating layer in proportion to overall membrane thickness The thickness of the actual separating layer can be calculated from the permeability and the permeance of the membrane. The permeability of a membrane is a measure of the permeability of a polymer material and thus is a property of a material irrespective of thickness, pressure or area. Flux through a hollow fibre membrane is normally expressed in terms of the permeance which, unlike the permeability, is not normalized for the thickness, since the layer thickness of a hollow fibre membrane is difficult to determine. The layer thickness of the actual separating layer is accordingly calculated according to the following formula:

$$l_{HFM} = \frac{\text{permeability}}{\text{permeance}} * 1000$$

where layer thickness $l_{HFM}$ is in nm, permeability is in barrers ($10^{-10}$ cm$^3$(STP)·cm·cm$^{-2}$·s$^{-1}$·cmHg$^{-1}$) and permeance is in GPUs ($10^{-6}$ cm$^3$(STP)·cm$^{-2}$·s$^{-1}$·cmHg$^{-1}$).

It was found that the Example 6 membrane of the present invention had a layer thickness of 91 nm for the actual separating layer. The prior art membrane according to Comparative Example 4, by contrast, had a layer thickness of 1929 nm, i.e. almost 2 µm, for the actual separating layer.

The invention claimed is:
1. A method of producing polyimide membranes, comprising the steps of:
a) producing a polyimide membrane from one or more than one dianhydride selected from the group consisting of 3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride, 1,1,1,3,3,3-hexafluoro-2,2-propylidenediphthalic dianhydride,
and
one or more than one diisocyanate selected from the group consisting of 2,4-tolylene diisocyanate, 2,6-tolylene diisocyanate, 4,4'-methylenediphenyl diisocyanate, 2,4,6-trimethyl-1,3-phenylene diisocyanate, 2,3,4,5-tetramethyl-1,4-phenylene diisocyanate,
b) annealing the membrane at a temperature in the range from 280° C. to the glass transition temperature of the polymer for the atmosphere surrounding the membrane at a distance of up to 10 cm, wherein a gas atmosphere having an oxygen content of not more than 0.5% by volume surrounds the membrane during the annealing and/or a gas stream having said oxygen content sweeps around the membrane during the annealing.

2. The method of claim 1, wherein
the annealing is conducted for 15 to 300 min from the time at which the target temperature for the annealing is attained,
and/or
the membrane is heated to the annealing temperature at a heating rate of 0.1 to 10° C./min,
and/or
the membrane is cooled from the annealing temperature down to a temperature of 200 to 275° C. in the atmosphere defined in claim 1 surrounding the membrane at a distance of up to 10 cm
and/or the gas stream defined in claim 1, or a vacuum is applied,
and/or the oxygen content of the atmosphere surrounding the membrane at a distance of up to 10 cm is not more than 0.25% by volume
and/or
the membranes before annealing has an oxygen permeance of not less than 25 GPU.

3. The method of claim 1 wherein step a) comprises the sub-steps of
a1) producing a solution of a polyimide polymer in an aprotic dipolar solvent by polymerizing corresponding monomers, and
a2) producing a casting solution comprising the polyimide polymer, and
a3) producing a polyimide membrane from the casting solution,
wherein the casting solution is produced in step a2) from the polymer solution obtained in step a1) without the polyimide between steps a1) and a2) or before step a1) being isolated in the form of a solid material and redissolved, and wherein the membrane is produced by a phase inversion method.

4. The method of claim 3, wherein
in sub-step a1) the aprotic dipolar solvent is selected from the group consisting of dimethylformamide, dimethylacetamide, N-methylpyrrolidinone, N-ethylpyrrolidinone, sulpholane, tetrahydrofuran, dioxane or mixtures thereof,
and/or
water-soluble additives are admixed for producing the casting solution in step a2), wherein the additives are volatile water-miscible solvents such as diethyl ether, tetrahydrofuran, dioxane or acetone or mixtures thereof and/or nonsolvents such as water, methanol, ethanol, n-propanol, isopropanol, butanol, butanediol, ethylene glycol, glycerol, gamma-butyrolactone or mixtures thereof and/or pore-formers, such as polyvinylpyrrolidinone and/or water-miscible solvents such as dimethylformamide, dimethylacetamide, N-methylpyrrolidinone, N-ethylpyrrolidinone, sulpholane, dimethyl sulphoxide or mixtures thereof.

5. The method of claim 1 comprising the following steps within step a):
aI) providing an optionally annealed polyimide polymer in the form of a solid material,
aII) producing a casting solution comprising a solvent and the solid material from step aI); and
aIII) forming a hollow fibre membrane from the casting solution.

6. The method of claim 5, wherein
a polyimide powder is annealed and/or dried in step aI) by a process of mechanical annealing, thermal annealing or a combination thereof,
and/or
a polyimide powder is dried and/or annealed in step aI) at a temperature of 50-250° C.

7. The method of claim 3, wherein in step a3) an integrally asymmetrical hollow fibre membrane is spun from the polyimide casting solution and a bore solution in a continuous process using a two-material die.

8. The method of claim 7, wherein the spinning die is at a distance of 5 cm to 1 m from a precipitation bath, wherein the hollow fiber before entry into the precipitation bath is subjected to the flow of a gas stream thermostated to 25 to 130° C. or is passed through a corresponding gas atmosphere.

9. The method of claim 8, wherein
the gas of said gas stream is selected from nitrogen, air, argon, helium, carbon dioxide, methane, and mixtures thereof,
and/or
said hollow fiber is subjected to said flow of a gas stream in a shaft at a gas velocity of between 0.1 and 10 m/min.

10. The method of claim 7 wherein
the membrane is subjected to one or more than one wash with water down to a residual solvent content of not more than 1% by weight after leaving the precipitation bath and before the annealing,
and/or
the membrane is subjected to a solvent exchange before the annealing,
and/or
the membrane is dried to a water and/or solvent content of not more than 5% by weight before the annealing step,
and/or
the membrane is spun at a haul-off speed between 10 and 80 m/min.

11. A polyimide membrane obtainable by the method of claim 1.

12. The method of claim 1, wherein the annealing temperature is from 280° C. to 370° C.

13. The method of claim 1, wherein the annealing temperature is from 285° C. to 360° C.

14. The method of claim 1, wherein the annealing temperature is from 290° C. to 350° C.

15. The method of claim 1, wherein the annealing temperature is from 300° C. to 340° C.

16. The method of claim 1, wherein the annealing temperature is from 305° C. to 330° C.

17. The method of claim 1, wherein the annealing temperature is from 310° C. to 320° C.

18. The method of claim 1, wherein the atmosphere surrounding the membrane at a distance of 2 to 10 cm is at a temperature of from 280° C. to the glass transition temperature of the polymer.

19. The method of claim 1, wherein the gas atmosphere and/or gas stream comprises an inert gas selected from nitrogen, noble gases, sulfur hexafluoride and mixtures thereof.

20. The method of claim 2, wherein the annealing is conducted for 60 to 120 min.

21. The method of claim 2, wherein the annealing is conducted for 60 to 90 min.

22. The method of claim 2, wherein the heating rate is 1 to 5° C./min.

23. The method of claim 2, wherein the heating rate is 1 to 2° C./min.

24. The method of claim 2, wherein the membrane is cooled down to a temperature of 200° C. to 250° C. in the atmosphere and/or gas stream defined in claim 1.

25. The method of claim 2, wherein the membrane is cooled down to a temperature of 200° C. to 220° C. in the atmosphere and/or gas stream defined in claim 1.

26. The method of claim 2, wherein the oxygen content of the atmosphere surrounding the membrane is at a distance of 2 to 10 cm.

27. The method of claim 2, wherein the oxygen content of the atmosphere surrounding the membrane is not more than 0.1% by volume.

28. The method of claim 2, wherein the membrane before annealing has an oxygen permeance of from 100 to 2000 GPU.

29. The method of claim 2, wherein the membrane before annealing has an oxygen permeance of from 300 to 1000 GPU.

30. The method of claim 2, wherein the membrane before annealing has an oxygen permeance of from 400 to 800 GPU.

31. The method of claim 5, wherein in step aIII) an integrally asymmetrical hollow fibre membrane is spun from the polyimide casting solution and a bore solution in a continuous process using a two-material die.

32. The method of claim 10, wherein the membrane is subjected to said wash with water down to a residual solvent content of not more than 0.5% by weight.

33. The method of claim 10, wherein the membrane is subjected to said solvent exchange after the wash.

34. The method of claim 10, wherein the membrane is dried after the wash to a water and solvent content of not more than 3% by weight before said annealing step.

35. The polyimide membrane of claim 11, wherein the polyimide is a polyimide of the following composition:

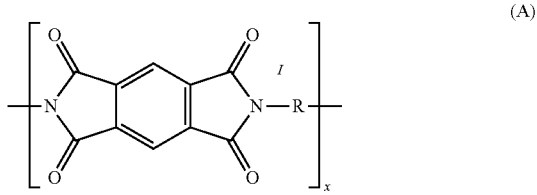
(A)

-continued

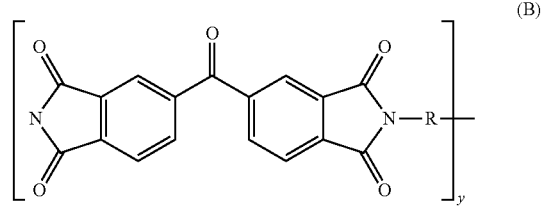
(B)

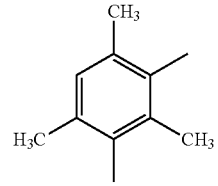
(L1)

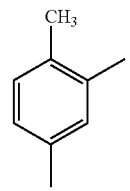
(L2)

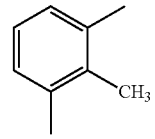
(L3)

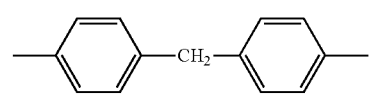
(L4)

where $0 \leq x \leq 0.5$ and $1 \geq y \geq 0.5$ and R represents one or more, identical or different moieties selected from the group consisting of the moieties L1, L2, L3 and L4.

36. A method of separating a gas mixtures containing a gas pair selected from the group consisting of:
(a) methane and carbon dioxide,
(b) oxygen and nitrogen,
(c) hydrogen and process gases,
(d) water vapour and gases or gas mixtures, and
(e) helium and gases or gas mixtures,
the method comprising contacting said gas mixture with a polyimide hollow fibre membrane obtainable by the method of claim 1.

* * * * *